(12) United States Patent
Reszewicz et al.

(10) Patent No.: US 11,112,024 B2
(45) Date of Patent: Sep. 7, 2021

(54) SERVO VALVE WITH IMPROVED SEALING AND METHOD OF MANUFACTURING THE SAME

(71) Applicant: Hamilton Sundstrand Corporation, Charlotte, NC (US)

(72) Inventors: Modest Adam Reszewicz, Wrocław (PL); Maciej Bujewicz, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/721,167

(22) Filed: Dec. 19, 2019

(65) Prior Publication Data

US 2020/0309280 A1 Oct. 1, 2020

(30) Foreign Application Priority Data

Mar. 29, 2019 (EP) .................................. 19461522

(51) Int. Cl.
*F16K 31/04* (2006.01)
*F16K 31/06* (2006.01)
*B23P 15/00* (2006.01)

(52) U.S. Cl.
CPC .......... *F16K 31/04* (2013.01); *F16K 31/0682* (2013.01); *B23P 15/001* (2013.01)

(58) Field of Classification Search
CPC ............. F16K 31/0682; F16K 13/0627; F16K 31/0679; F16K 31/04; F15B 13/0438
See application file for complete search history.

(56) References Cited

U.S. PATENT DOCUMENTS

| 3,323,090 | A |   | 5/1967  | O'Brien |            |
|-----------|---|---|---------|---------|------------|
| 3,415,283 | A |   | 12/1968 | Trbovich et al. |    |
| 3,489,179 | A |   | 1/1970  | McNeil et al. |      |
| 3,496,561 | A | * | 2/1970  | Seidel  | H03M 1/00  |
|           |   |   |         |         | 341/149    |
| 3,746,046 | A |   | 7/1973  | Werner et al. |      |
| 3,749,129 | A |   | 7/1973  | Amdur   |            |

(Continued)

FOREIGN PATENT DOCUMENTS

| EP | 3284956 A1 | 2/2018 |
|----|------------|--------|
| GB | 2123185 A  | 1/1984 |

OTHER PUBLICATIONS

European Search Report for application No. 19461522.5 dated Aug. 21, 2019; 12 pgs.

*Primary Examiner* — Michael R Reid
(74) *Attorney, Agent, or Firm* — Cantor Colburn LLP

(57) ABSTRACT

A servovalve includes a torque motor section and a hydraulic section. The torque motor section may comprise first and second opposing pole pieces and first and second permanent magnets may be positioned between these first and second pole pieces. The torque motor section also comprises an armature/flapper assembly which comprises a torsion bridge, an armature plate and a flapper that is connected at a first end to the armature plate. The flapper extends from said armature plate along a first longitudinal axis X. The armature plate may extend between the first and second permanent magnets and along a second longitudinal axis Y that is perpendicular to the first axis X. The hydraulic section comprises: a housing that comprises a body section and a chimney section. The chimney section extends from the body section to a first end.

10 Claims, 4 Drawing Sheets

(56) References Cited

U.S. PATENT DOCUMENTS

| | | | |
|---|---|---|---|
| 3,838,710 A * | 10/1974 | Reip | ............... F16K 31/0682 137/596.15 |
| 4,285,363 A | 8/1981 | Kolm | |
| 5,035,254 A | 7/1991 | Blatter et al. | |
| 5,465,757 A | 11/1995 | Peters | |
| 10,197,178 B2 | 2/2019 | Rateick et al. | |

* cited by examiner

SERVO VALVE WITH IMPROVED SEALING AND METHOD OF MANUFACTURING THE SAME

FOREIGN PRIORITY

This application claims priority to European Patent Application No. 19461522.5 filed Mar. 29, 2019, the entire contents of which is incorporated herein by reference.

FIELD

The examples described herein relate to the field of servovalves and in particular towards sealing means for servovalves.

BACKGROUND

Servovalves are somewhat complicated structures with complex and expensive parts. They also contain seals that are vulnerable to leakage. Servovalves are also difficult to assemble and calibrate. It would therefore be useful to provide a servovalve that overcomes these problems and that further allows the servovalve to be better sealed.

U.S. Pat. Nos. 3,749,129A and 3,746,046A both disclose a servovalve with a dry torque motor operating an armature which controls a flapper valve, and an O-ring for sealing the dry torque motor from the flapper valve.

SUMMARY

A servovalve with improved sealing is described herein. The servovalve comprises a torque motor section and a hydraulic section. The torque motor section may comprise first and second opposing pole pieces and first and second permanent magnets may be positioned between these first and second pole pieces. The torque motor section also comprises an armature/flapper assembly which comprises a torsion bridge, an armature plate and a flapper that is connected at a first end to the armature plate. The flapper extends from the armature plate along a first longitudinal axis X. When first and second permanent magnets are provided, the armature plate extends between the first and second permanent magnets along a second longitudinal axis Y that is perpendicular to the first axis X. The hydraulic section comprises: a housing that comprises a body section and a chimney section. The chimney section extends from the body section to a first end. The chimney section has an outer surface and an internal hollow channel extending along the first longitudinal axis X and from the first end and into said body section. In use, the flapper is positioned so as to extend within this internal hollow channel. The servovalve further comprises means for sealing the torque motor section from the hydraulic section so that hydraulic fluid does not leak from the hydraulic section into the torque motor section. The sealing means is positioned on the outer surface of the chimney section at its first end. The torsion bridge is also provided around the sealing means so that the sealing means contacts both an inner surface of the torsion bridge and the outer surface of the chimney section. This thereby provides an improved seal between the inner surface of the torsion bridge and the outer surface of the chimney section. A method of manufacturing such an improved servovalve is also described herein.

In some examples described herein, the sealing means may comprise an O-ring. Other sealing means may also be used.

In some examples described herein, the servovalve may further comprise a groove provided on said outer surface of the chimney section at the first end. The sealing means may be positioned within the groove so that it sits in the groove.

In some examples described herein, the torsion bridge may contact both said outer surface of said chimney section and said armature plate.

In some examples described herein, the armature plate and flapper may be brazed together.

In some examples described herein, the torsion bridge may be welded to the armature plate.

A method of manufacturing a servovalve having a torque motor section and a hydraulic section is also described herein. The method comprises forming the torque motor section. In some examples this may be by providing first and second opposing pole pieces and positioning first and second permanent magnets between the first and second pole pieces. The method further comprises providing an armature/flapper assembly by connecting a first end of a flapper to an armature plate so that the flapper extends from the armature plate along a first longitudinal axis X; and positioning the armature plate so that it extends between the first and second permanent magnets (if present) along a second longitudinal axis Y that is perpendicular to said first axis X. The method further comprises: providing the hydraulic section by: providing a housing that comprises a body section and a chimney section, said chimney section extending from said body section to a first end, said chimney section having an outer surface and an internal hollow channel extending along said first longitudinal axis X and from said first end and into said body section. The method further comprises: positioning said flapper so as to extend within said internal hollow channel; and said method further comprises: sealing said hydraulic section from said torque motor section by: providing a sealing means on said outer surface of said chimney section at said first end; and providing a torsion bridge around said sealing means, so that said sealing means contacts both an inner surface of said torsion bridge and said outer surface of said chimney section, to thereby provide a seal between said inner surface of said torsion bridge and said outer surface of said chimney section.

In some examples described herein, said sealing means comprises an O-ring.

In some examples described herein, the method may further comprise providing a groove on said outer surface of said chimney section at said first end, and positioning said sealing means within said groove.

In some examples described herein, the method may further comprise: positioning said torsion bridge so that it contacts both said outer surface of said chimney section and said armature plate.

In some examples described herein, the method may further comprising brazing said armature plate and said flapper together.

In some examples described herein, the method may further comprise welding said torsion bridge to the armature plate.

DETAILED DESCRIPTION

Figure 1:
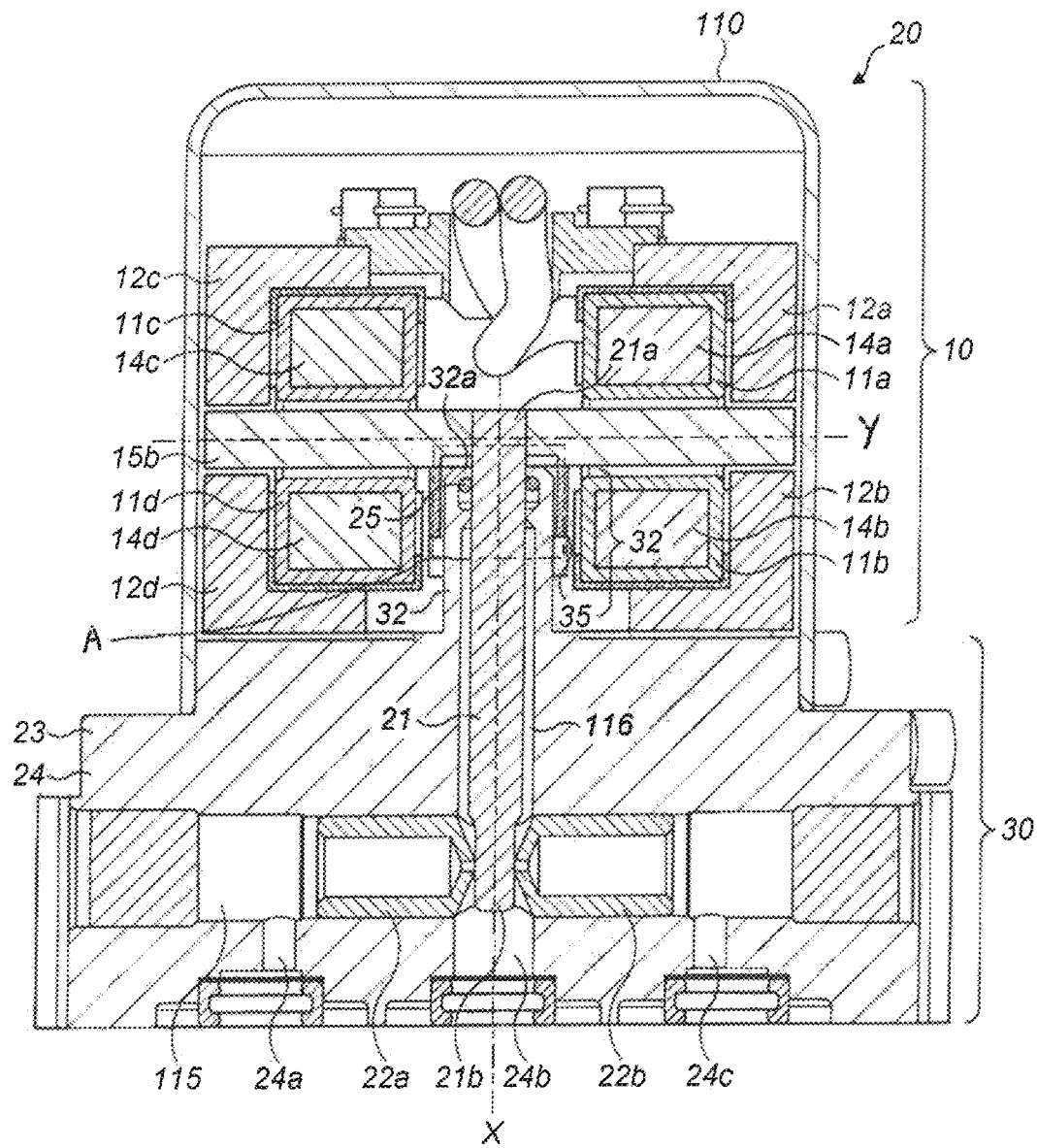
FIG. 1 shows a side cross-sectional view of a known flapper nozzle servovalve.

FIG. 1 depicts a side cross-sectional view of a known flapper nozzle servovalve 20. As shown in the figure, the servovalve 20 can be considered to comprise two sections: a torque motor section 10 and a hydraulic/pneumatic/fuel section 30. The torque motor section 10 functions as a driver for the hydraulic section 30. The hydraulic section 30 comprises first and second nozzles 22a, 22b and allows for the passage of hydraulic fluid in and out of ports 24a (supply port), 24b (control port) and 24c (return port) as is known in the art.

As is also known in the art, the torque motor 10 may, on one side, comprise a first magnetic coil 11a positioned to extend around a first permanent magnet 14a and a second magnetic coil 11b positioned to extend around a second permanent magnet 14b. A first pole piece 12a is positioned adjacent to the first permanent magnet 14a and associated coil 11a and a second pole piece 12b is positioned adjacent to the second permanent magnet 14b and associated coil 11b. These features are duplicated on the opposite side of the torque motor 10 so that in the example shown in FIG. 1, a total four permanent magnets 14a, 14b, 14c, 14d are provided, each having an associated coil as described above (11a, 11b, 11c, 11d respectively), as well as four pole pieces 12a, 12b, 12c, 12d.

An armature/flapper assembly is located between the first and second permanent magnets 14a, 14b and the first and second pole pieces 12a, 12b, with the permanent magnets and armature/flapper assembly being positioned between opposing pole pieces 12a, 12b. As is known in the art, the armature/flapper assembly may be held in place within the servovalve using armature fix screws, or other fixation means.

The armature/flapper assembly comprises a torsion bridge 35, a flapper 21 extending along a first longitudinal axis X (in the direction of the hydraulic section 30), and an armature plate 15b extending along a second axis Y which is perpendicular to the first axis X.

The flapper 21 is coupled at a first end to the armature plate 15b of the armature/flapper assembly with the second, opposite end of the flapper 21 being free to move and positioned within the main body 24 of the hydraulic section 30 so as to be movable between the first and second nozzles 22a, 22b, in use. The flapper 21 is therefore configured and positioned to extend along an axis X that is perpendicular to the axis Y of the armature plate 15b. This therefore creates a "T-shaped" armature/flapper assembly as can be seen in the figures.

The torque motor section 10 may be encased within a cover 110. The cover 110 is connected to a housing 23 of the hydraulic section 30 to thereby connect the two sections 10, 30 together. Different means may be used to connect these two sections together. In the example shown in FIG. 1, a bolt is used.

The housing 23 of the hydraulic section 30 has internal hollow channels 115, 116, which are in fluid communication with each other to allow for the passage of hydraulic fluid therethrough. A first of the channels 116 is positioned so as to extend along the same axis X as the flapper 21. A second channel 115 is also provided which extends perpendicularly to this first channel 21. First and second nozzles 22a, 22b are provided within this second channel 115 as shown in FIG. 1. Ports 24a, 24b and 24c as described above are also provided that are in fluid communication with this second channel 115 for the input and output of hydraulic fluid.

The first channel 116 is formed so as to extend internally into the housing 23 of the hydraulic section 30 and this is formed by the housing 23 having not only a main body section 24 (that houses the nozzles 22a, 22), but by also comprising a "chimney shaped" section 32 that protrudes from the main body section 24 of the housing 23 and in the direction of the torque motor section 10, as shown in FIG. 1. That is, this chimney section 32 is a hollow protruding, generally cylindrical section 32 inside which the flapper 21 is received. The first channel 116 extends longitudinally along the X axis within this chimney section 32 and into the main body 24 of the housing 23.

As can be seen in FIG. 1, the protruding chimney section 32 extends from the main body section 24 of the housing 23 (i.e. in the direction of the torque motor 10) and has a first end 32a that is furthest away from the main body 24. An opening 116a into the channel 116 and chimney section 32 is provided at this first end 32a. This opening 116a is also sized and shaped so as to be capable of receiving the flapper 21. The flapper 21 is positioned within this channel 116 in use.

As is known in the art, when a current is applied to the coils 11a, 11b, a magnetic flux acting on the ends of the armature plate 15b develops. The magnetic flux will cause the ends of the armature plate 15b to be attracted to/repelled from the pole pieces 12a, 12b, thereby causing a movement in the armature plate 15b, and therefore the flapper 21.

In known servovalves such as that shown in FIG. 1, the sealing of the torque motor section 10 from the hydraulic section 30 is provided by an O-ring 25 that is positioned within the interior channel 116 of the protruding cylindrical chimney section 32. Specifically, the flapper 21 extends along the X axis, through the center of the channel 116 and the O-ring 25 and is sized, shaped and positioned so as to be located between and in contact with both the outer surface of the flapper 21 and the interior surface of the hollow cylindrical chimney section 32 through which it extends. Due to the fact that the O-ring 25 contacts both of these surfaces, a seal is therefore made which prevents fluid from the hydraulic section 30 passing into the torque motor section 10 of the servovalve 20.

In some examples, a circumferential groove 28 may be provided in the interior surface of the protruding cylindrical chimney section 32 and the O-ring 25 may be positioned so as to sit in this groove 28.

The positioning and manufacture of this type of known groove 28 and O-ring 25, however, can be difficult to achieve. In particular, the manufacturing process of the chimney section 32 of the housing 23 through which the flapper 21 extends and the measurements of the O-ring 25 can be challenging due to the small dimensions and tight tolerances required. The manufacture of the flapper 21 is also difficult to achieve due to the tight tolerance required of its diameter. The assembly process of the servovalve 20 can also be problematic due to the small dimensions of the O-ring 25 and its placement inside the interior channel 116 if the chimney section 32 of the hydraulic section housing 23.

Figure 2A:
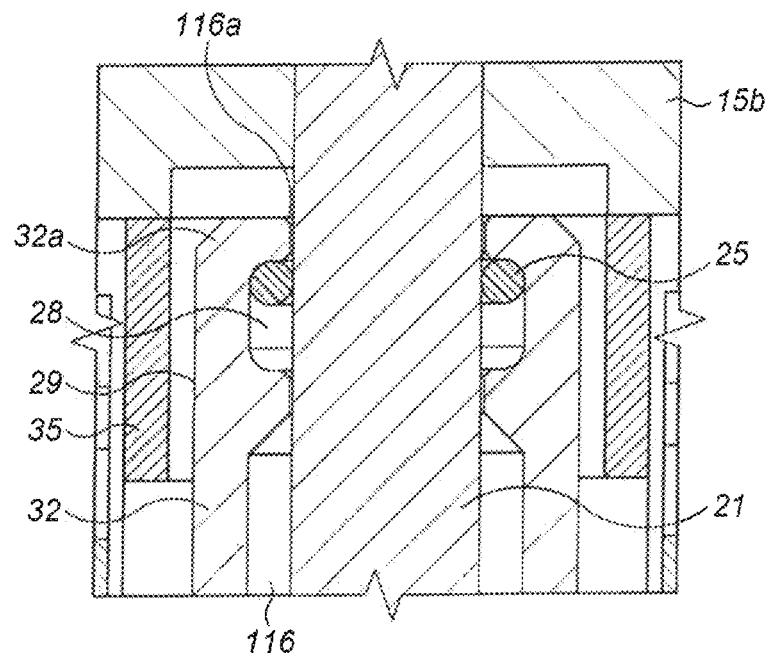
FIG. 2a shows a first enlarged cross-sectional view of a section A of the known flapper nozzle servovalve shown in FIG. 1.
Figure 2B:
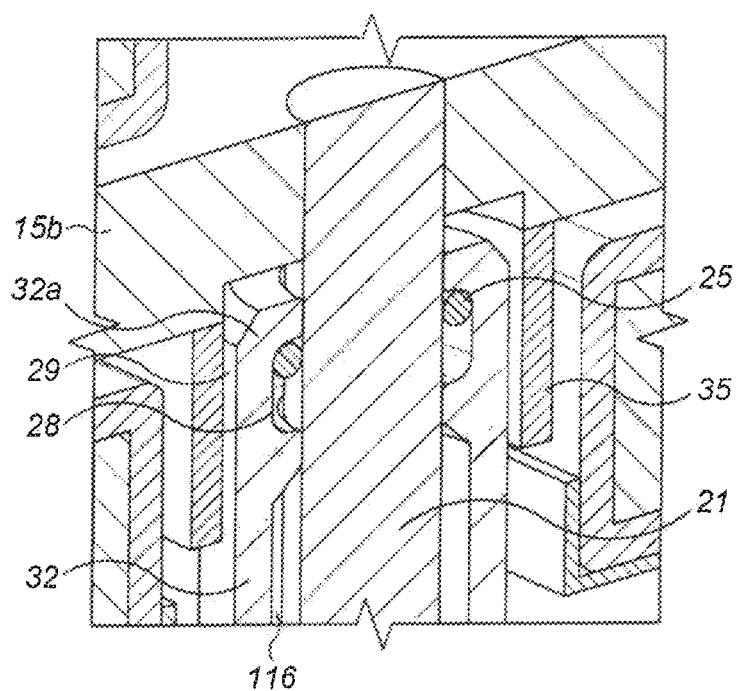
FIG. 2b shows a second enlarged perspective cross-sectional view of the section A of the known flapper nozzle servovalve of FIG. 1.
Figure 3:
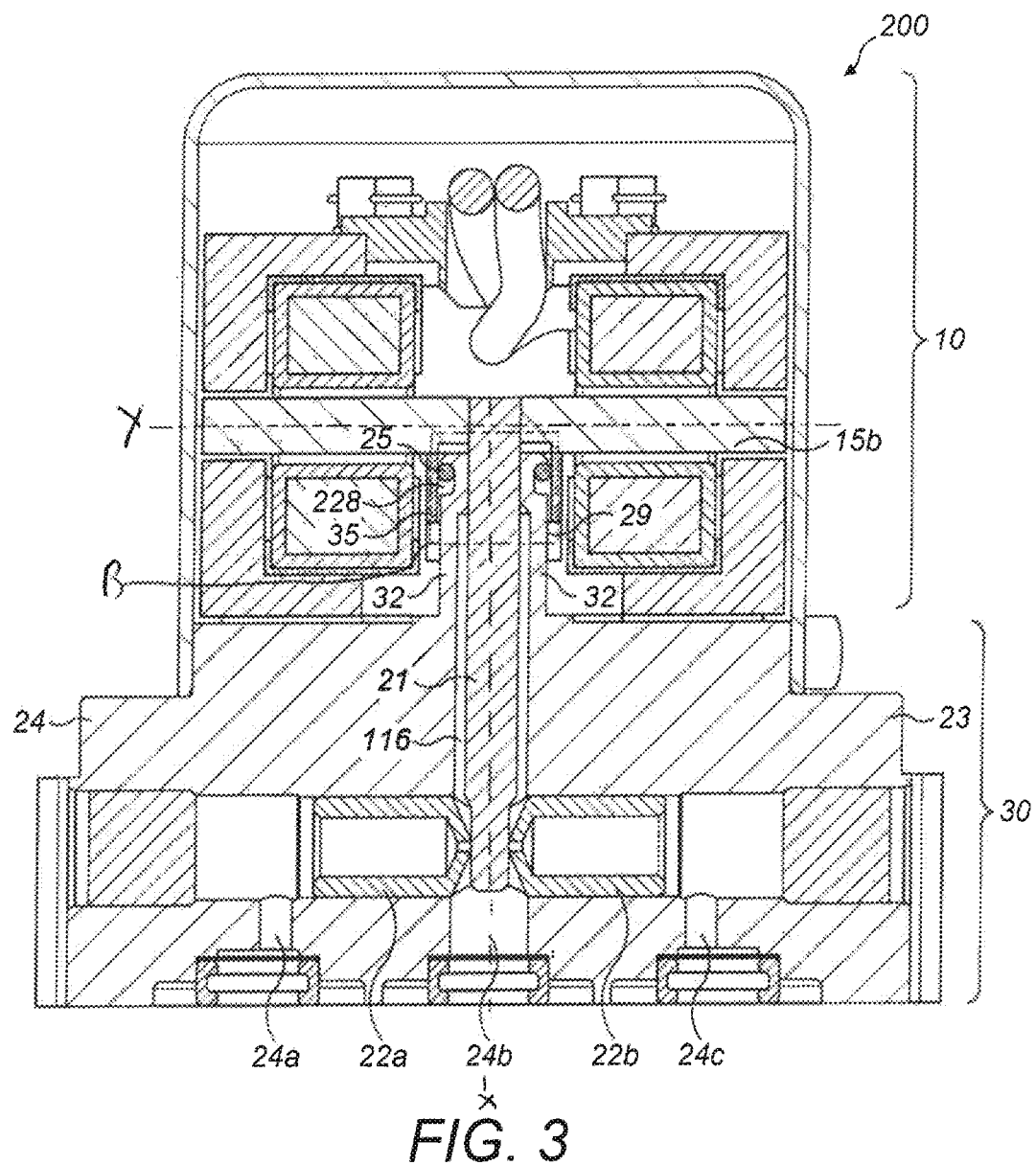
FIG. 3 shows a side cross-sectional view of a new, exemplary flapper nozzle servovalve as described herein.

A new, exemplary servovalve 200 that comprises an improved sealing interface is depicted in FIG. 3 and described below with further reference to FIGS. 4a and 4b. The new servovalve 200 comprises some of the same features/similar features as described above with reference to FIGS. 1 to 2b and so the description of those features is not repeated here.

As can be seen in FIG. 3, the housing 23 of the new type of servovalve 200 also has a "chimney shaped" section, i.e. a protruding cylindrical section 32, however, in this example, a sealing means is not positioned within the interior channel 116 of the protruding chimney section 32, but is instead positioned so as to extend circumferentially around the exterior surface 29 of the protruding chimney section 32, at its first end 32a. In the examples shown and described herein, the sealing means comprises an O-ring 25, however, other sealing means may be envisaged.

Figure 4A:
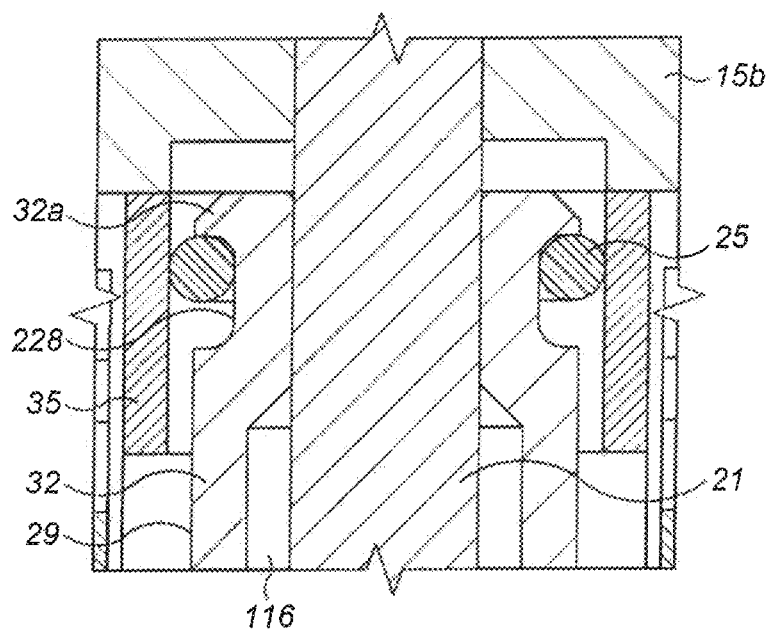
FIG. 4a shows a first enlarged cross-sectional view of the section B of the new, exemplary flapper nozzle servovalve as described herein and as shown in FIG. 3.
Figure 4B:
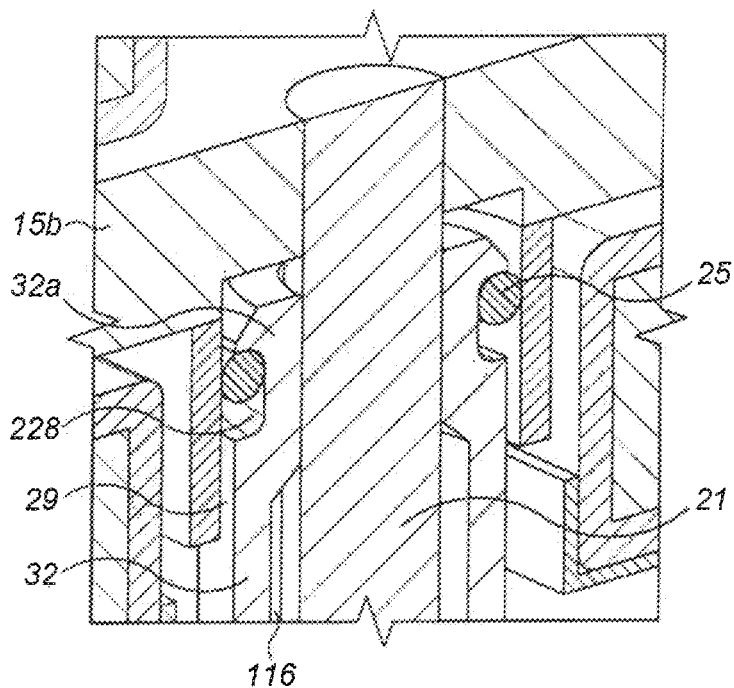
FIG. 4b shows a second enlarged perspective cross-sectional view of the section B of the new, exemplary flapper nozzle servovalve shown in FIGS. 3 and 4a and as described herein.

In some examples, such as that shown in FIGS. 3, 4a and 4b, a groove 228 may be provided on this exterior surface 29 and the O-ring 25 may be positioned so as to sit in this external groove 228.

A sealing interface is achieved between the inner surface of the torsion bridge 35 which is further provided at the first end 32a of the chimney section 32 and is positioned so as to also surround the exterior surface 29 of the protruding chimney section 32 at its first end 32a. The O-ring 25 is positioned so that it sits between and contacts both the interior surface of the torsion bridge 35 and the exterior surface 29 of the protruding chimney section 32 at its first end 32a. In some examples the armature plate 15b, torsion bridge 35 and flapper 21 of the armature flapper assembly may be brazed together so that the three individual components form one solid part. The torsion bridge 35 is therefore in contact with and/or welded to the armature plate 15b so as to prevent leakage of fluid between the torsion bridge 35 and the armature plate 15b. The sealing interface therefore is provided between the O-ring 25, the outside surface of the chimney section 32, and the torsion bridge 35 of the armature/flapper assembly. Therefore, the fluid would only potentially be able to fill the area above the O-ring 25 as shown in FIG. 4a.

This new type of servovalve 200 described herein therefore provides several benefits over known servovalves. For example, installing the O-ring 25 on the exterior surface 29 of the chimney section 32 of the housing 23 means that the O-ring 25 can be manufactured in a larger size than normal. In addition to this, the seal provided between the outer surface of the chimney section 32 and the torsion bridge 35 surrounding it provides better sealing than in known servovalves 20 wherein the seal is with the outer surface of the flapper 21. The groove 228 within which to install the O-ring 25 is also easier to manufacture since it is larger than the groove that is conventionally provided within the interior of the chimney section 32. The assembly of the O-ring 25 can also be carried out without any additional or special tooling. Due to the wider tolerances of the housing 23 and flapper 21, the parts are also cheaper to manufacture.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

What is claimed is:

1. A servovalve comprising:
a torque motor section that comprises:
an armature/flapper assembly comprising:
a torsion bridge;
an armature plate; and
a flapper connected at a first end to said armature plate, said flapper extending from said armature plate along a first longitudinal axis X;
wherein the armature plate extends along a second longitudinal axis Y that is perpendicular to said first axis X; and
a hydraulic section that comprises:
a housing that comprises a body section and a chimney section, said chimney section extending from said body section to a first end, said chimney section having an outer surface and an internal hollow channel extending along said first longitudinal axis X and from said first end and into said body section;
wherein said flapper is positioned so as to extend within said internal hollow channel;
means for sealing said torque motor section from said hydraulic section, said sealing means being positioned on said outer surface of said chimney section at said first end;
wherein said torsion bridge is provided around said sealing means, so that said sealing means contacts both an inner surface of said torsion bridge and said outer surface of said chimney section, to thereby provide a seal between said inner surface of said torsion bridge and said outer surface of said chimney section; and
a groove provided on said outer surface of said chimney section at said first end, and wherein said sealing means is positioned to sit in said groove.

2. The servovalve of claim 1 wherein said sealing means comprises an O-ring.

3. The servovalve of claim 1, wherein said torsion bridge contacts both said outer surface of said chimney section and said armature plate.

4. The servovalve of claim 1, wherein said armature plate and flapper are brazed together.

5. The servovalve of claim 1, wherein said torsion bridge is welded to the armature plate.

6. A method of manufacturing a servovalve having a torque motor section and a hydraulic section, the method comprising:
forming said torque motor section by:
providing an armature/flapper assembly by providing a torsion bridge and connecting a first end of a flapper to an armature plate so that said flapper extends from said armature plate along a first longitudinal axis X; and
positioning said armature plate so that it extends along a second longitudinal axis Y that is perpendicular to said first axis X;
said method further comprising:
providing said hydraulic section by:
providing a housing that comprises a body section and a chimney section, said chimney section extending from said body section to a first end, said chimney section having an outer surface and an internal hollow channel extending along said first longitudinal axis X and from said first end and into said body section; and
wherein said method further comprises:
positioning said flapper so as to extend within said internal hollow channel; and wherein said method further comprises:
sealing said hydraulic section from said torque motor section by:
providing a sealing means on said outer surface of said chimney section at said first end; and providing said torsion bridge around said sealing means, so that said sealing means contacts both an inner surface of said torsion bridge and said outer surface of said chimney section, to thereby provide a seal between said inner surface of said torsion bridge and said outer surface of said chimney section; and
providing a groove on said outer surface of said chimney section at said first end, and positioning said sealing means within said groove.

7. The method of claim 6, wherein said sealing means comprises an O-ring.

8. The method of claim 6, further comprising:
positioning said torsion bridge so that it contacts both said outer surface of said chimney section and said armature plate.

9. The method of claim 6, further comprising brazing said armature plate and said flapper together.

10. The method of claim 6, further comprising welding said torsion bridge to the armature plate.

\* \* \* \* \*